Oct. 7, 1941.   J. E. GRAY   2,258,323
AUTOMATIC FUEL SHUTOFF FOR VEHICLES
Filed March 18, 1939
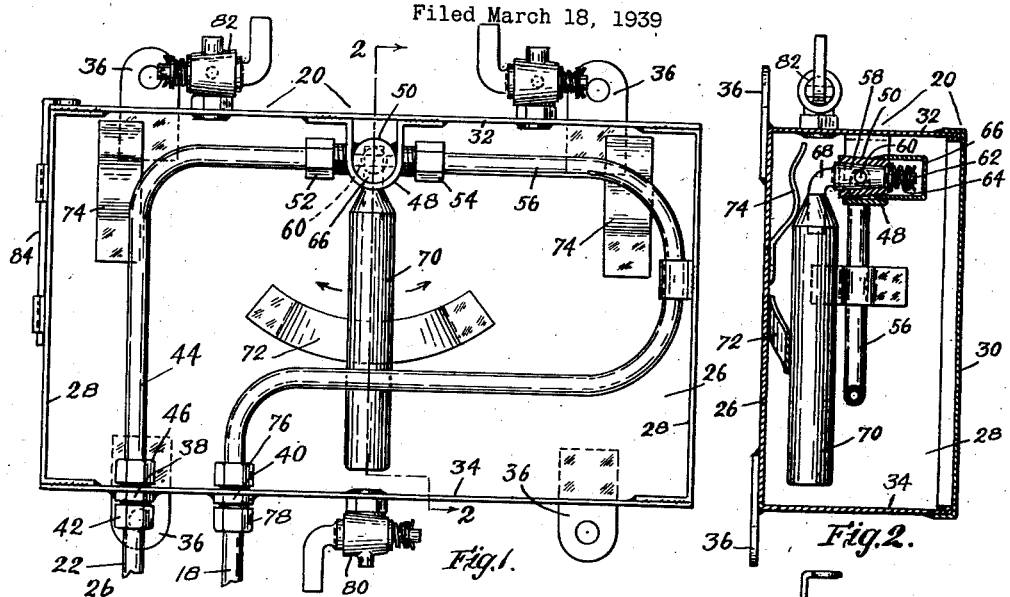
Fig.1.
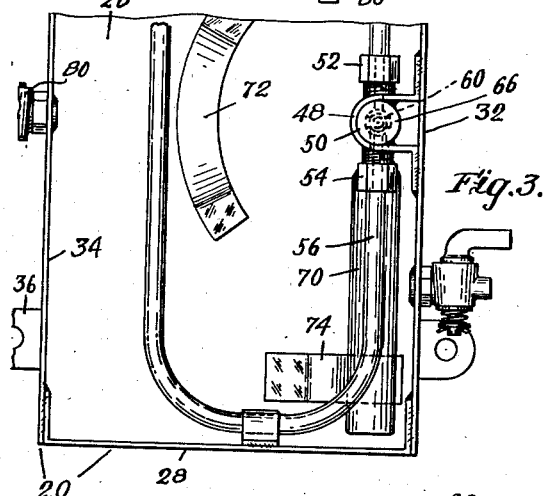
Fig.3.
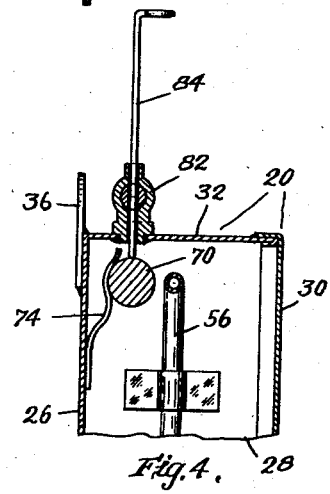
Fig.2.
Fig.4.
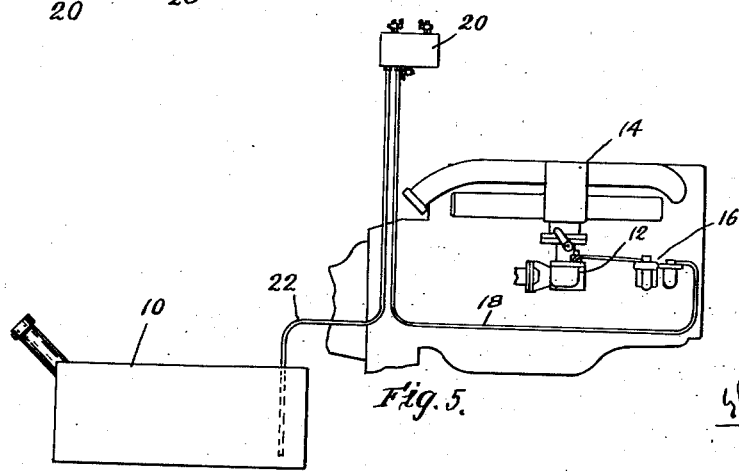
Fig.5.
Inventor.
James E. Gray
atty Patented Oct. 7, 1941

2,258,323

UNITED STATES PATENT OFFICE 2,258,323

AUTOMATIC FUEL SHUTOFF FOR VEHICLES

James E. Gray, Charlestown, Mass.

Application March 18, 1939, Serial No. 262,797

12 Claims. (Cl. 180—82)

The present invention relates to improvements in safety devices for motor vehicles and, as illustrated herein, relates more particularly to a device for preventing the flow of fuel from the fuel tank to the carburetor of an internal combustion engine when the truck or other motor vehicle in which the engine is mounted overturns.

The fuel tank of a motor vehicle is ordinarily located at a lower level than the pump and carburetor. Thus when the vehicle accidentally overturns, that is to say, turns over on its side or onto its top, or is severely canted, the fuel is free to flow from the tank through the pump and into the carburetor. The fuel, which is ordinarily gasoline, will then flow out of the carburetor float chamber and onto the engine, which may continue to operate, and onto the hot exhaust pipe. Thus a fire may be caused initially by the spilling of fuel from the float chamber onto the hot exhaust manifold. Such fires are exceedingly difficult to extinguish since they are fed by fuel flowing from the tank through the carburetor and often times are not brought under control until after the truck has been seriously damaged. Furthermore, the accident may injure the operator to such an extent that he is unable to escape from the cab before he is seriously burned. Moreover, the overturning of the vehicle may cause the doors of the cab to stick or bind and thus prevent the escape of the operator. Thus it is apparent that danger of injury by fire, not only to the vehicle but also to the driver thereof, becomes very great when the vehicle is overturned. This danger is further increased when the internal combustion engine continues to operate after the vehicle is overturned. It is important, therefore, to prevent the flow of fuel from the fuel tank to the carburetor after the vehicle is overturned, this also causing the engine to stop running through lack of fuel.

Hence one object of the present invention is the provision of improved means to prevent fires in a motor vehicle which has been involved in an accident.

Another object of the invention is to provide automatic means for shutting off the flow of fuel from the tank to the carburetor when a motor vehicle has accidentally been overturned.

A still further object of the invention is to provide an improved fuel supply system for motor vehicles whereby fires following an accident will be substantially prevented.

A still further object is to provide an improved device which is compact and which may easily and inexpensively be applied to motor vehicles now in use.

A specific object of the invention is to provide a gravity-operated valved shut-off device for the fuel line wherein the valve has a movable part that is under the fuel pressure and also under atmospheric pressure and to arrange the device in the fuel line above the fuel tank and carburetor of the engine so that the fuel pressure in the valve is less than atmospheric pressure so that atmospheric pressure will prevent leakage of fuel at the contacting surfaces of the valve parts and also hold the surfaces firmly in leakless engagement.

A still further object of the invention is to improve generally the construction and operation of motor vehicles.

With the above and other objects in view, the invention will now be described with particular reference to the accompanying drawing, illustrating one preferred embodiment of the invention, in which:

Fig. 1 is a view in front elevation of the present invention with the front cover of the enclosing casing removed;

Fig. 2 is a view in vertical cross-section taken along the line 2—2 of Fig. 1;

Fig. 3 is a fragmentary view similar to the one shown in Fig. 1 but illustrating the device after it has been rotated 90°;

Fig. 4 is a view in cross-section showing the parts in the position illustrated in Fig. 3 but with a petcock open to permit the weighted member to be turned to its normal position and;

Fig. 5 is a diagrammatic view in side elevation showing the relative position of the fuel tank, carburetor and safety device.

The present invention is illustrated as applied to a motor vehicle wherein a gasoline or fuel tank 10 is located at a level substantially below the carburetor 12 of an internal combustion engine 14. The fuel is supplied to the carburetor 12 from the tank 10 by a pump 16 which is connected to the tank through a system of suitable pipes or tubes 18.

A safety or shut-off device 20 is located substantially above both the tank 10 and the carburetor 12. As illustrated in Fig. 5, a tube or pipe 22 extends from the bottom part of the tank 10 to the safety device 20. Other pipes are located inside of the safety device 20 and are arranged to form a continuous passage to permit the fuel to flow into the pipe 18 as will later be explained.

The safety device 20 includes a rectangular casing having a back or rear wall 26, side walls 28, top and bottom walls 32 and 34 respectively and a cover 30. The back wall 26 has secured thereto, adjacent to the top and bottom edges of its outer surface, securing members 36 which are fastened to the wall 26 by welding or any other suitable means. As illustrated, each of the members 36 is provided with a hole arranged to receive a bolt or other fastening by which the device is secured to the rear wall of the engine compartment and as near the top thereof as is practicable.

The bottom wall 34 of the safety device 20 is provided with a pair of holes which are arranged to receive threaded couplings 38, 40 which are arranged to be secured to the bottom wall 34 by welding, soldering or any other suitable means. The lower end of the coupling 38 is arranged to receive the upper end of the fuel pipe or tube 22 which is held in position by a clamping or compression nut 42. The upper end of the coupling 38 is also threaded and receives the lower end of a pipe or tube 44 which is clamped to the coupling by a nut 46 in any common manner. It is to be noted that the clamping nuts 42, 46 clamp the ends of the pipes to the coupling so tightly that leakage of fuel at these points is prevented. The top 32 of the safety device is provided with a substantially U-shaped strip member 48 which is rigidly secured to the under surface of the top 32 which is arranged to receive a shut-off valve 50 herein illustrated as of the plug type. The body of the valve 50 is arranged to be rigidly secured to the U-shaped member 48 by soldering, welding or the like. Each end of the valve body is provided with a threaded portion arranged to receive clamping nuts 52 and 54, respectively. The clamping nut 52 clamps the end of the tube 44 to the left hand threaded portion of the valve body 50 and the clamping nut 54 clamps a tube 56 to the threaded end at the right end of the valve body 50. The valve body 50 is provided with a tapered hole to receive a plug valve 58 which is provided with a passage 60 therethrough arranged normally to be in alignment with the substantially horizontal passages formed in the right and left threaded portions of the valve body 50. The plug valve 58 is provided at its small end with an axially projecting pin 62 which is encircled by a spiral compression spring 64 which is so arranged as to urge the plug valve 58 toward the right, as viewed in Fig. 2, to seat the valve 58 securely yet freely movably in the tapered opening formed in the valve body 50 to prevent leakage of fuel between the plug and body. There is provided a cap 66, as illustrated, which is secured in position by means of solder or other suitable means in such a manner that the fuel cannot escape from the cap 66.

The other or large end of the plug valve 58 is exposed and is provided with an outwardly and downwardly extending portion 68 which may be formed as a part of the plug 58. This downwardly extending portion is secured to a weighted member 70 which has substantial mass and which tends to remain in a vertical position. Thus when the vehicle carrying the safety shut-off is severely canted sidewise, the angular displacement of the valve casing about the stationary plug will cause the valve to close. Since the canting or upsetting of the vehicle usually is violent, the member 70 also is caused to move, thereby effecting the sudden and positive full-closing of the valve.

The position of the parts when the vehicle is overturned is best illustrated in Fig. 3 wherein the weighted member 70 is illustrated as being parallel to the top of the casing instead of being at right angles thereto, as shown in Fig. 1, which is the normal position of the parts.

It is evident that the member 70 may swing either to the right or to the left as indicated by the arrows in Fig. 1 and will tend to swing slightly in either one or both of these directions during normal operation of the vehicle. It is evident that this slight swinging decreases slightly the effective cross-sectional area of the passages formed in the horizontally extending portions of the valve body 50, with the result that the flow of fuel may be undesirably decreased to such an extent that the engine 14 will not operate evenly and smoothly. To prevent this undesired swinging of the member 70, the back wall 26 is provided with a member 72 having a forwardly extending bowed portion which is arranged to yieldingly and frictionally engage the member 70 to prevent the undesired sidewise movement during normal operation of the vehicle. The member 72, as illustrated, is secured at its end portions to the back wall 26 of the device by welding or other suitable means. The member 72 in addition to preventing the sidewise swinging movement of the member 70 serves further to urge the plug valve 58 toward the right as viewed in Fig. 2 thus tending to seat the valve more securely and firmly.

After the vehicle is overturned and the weighted member 70 is in the position illustrated in Fig. 3, it is desirable that the flow of fuel between the fuel tank 10 and the carburetor 12 be maintained shut off until such time as it is desirable to provide a continuous unobstructed passage for the fuel. For instance, after the vehicle has been restored to normal position and is back on the road, the fuel should not be allowed to flow into the carburetor until an inspection indicates that it is proper to do so. To this end, there is provided means for maintaining the weighted member 70 in the position shown in Fig. 3 when the vehicle has been returned to its normal position. As illustrated this means comprises a spring clip 74 having its lower end fastened to the back wall 26 of the device 20 by welding or soldering. The upper end portion of the spring clip 74 is slightly curved to fit substantially the transverse curvature of the member 70 when the member 70 is swung from the position shown in Fig. 1 to the position shown in Fig. 3. The movement of member 70 will cause the spring clip 74 to yield slightly to permit the member 70 to pass the high point thereon. The spring clip 74 is sufficiently rigid or unyielding to prevent the weighted member 70 from returning to its normal position when the vehicle is returned to its normal position. As illustrated, each side portion of the back wall 26 is provided with one of these spring clips 74 thus providing means for maintaining the weighted member 70 in position after it has been swung in either direction as the vehicle is being overturned. It is to be noted that the spring clips normally tend to move the weighted member 70 to the right, as viewed in Fig. 2, and thus tend to urge the plug valve 58 against its seat. The pipe 56 hereinbefore referred to is connected at its lower end to the coupling 40 by a clamping nut 76 and the upper end of the pipe 18 which extends therefrom to the pump 16 is also connected to the coupling 40 by a clamping nut 78. After the parts have been assembled as above described the cover 30 is applied and is soldered or welded in position in such a manner that the elements contained within the safety device 20 are hermetically sealed so that even if there should be a slight leakage of fuel from the valve 50 under certain conditions it would be retained within the body of the safety device and would not be spilled or dropped on the engine to cause or feed a fire.

It is desirable, however, to provide means for draining the casing of the hermetically sealed safety device 20 if necessary and, to this end, the bottom wall 34 of the casing is provided with a petcock 80 which is rigidly and tightly secured thereto by solder or other suitable means. This petcock is normally closed but may be turned to open position to permit any accumulated fuel to be withdrawn from the interior of the casing.

It is desirable also to provide means to enable the operator to gain access to the interior of the casing to return the weighted member 70 to its normal position after the overturned vehicle has been returned to its normal position. The top 32 of the casing is provided, adjacent to each end, with a petcock 82 which is suitably secured to the top wall 32 by soldering or welding. These petcocks 82 are normally closed but may be opened to permit the operator to engage the weighted member 70 to free the same by means of a pin 84 insertable through the valve, as illustrated in Fig. 4. After this operation is completed the pin 84 is withdrawn from the petcock which is then again closed. The pin 84 is normally frictionally retained removably in clips 86 secured to the end wall 28 of the casing 20.

Also in accordance with this invention the safety device is located in the highest part of the fuel line and above the fuel level in the tank and carburetor, as illustrated in Fig. 5. It is apparent that, with the above construction wherein the safety device is located at as high a point as possible on the back wall of the engine chamber, the momentum of the member 70 is as great as possible to insure that the valve 50 will be closed when the vehicle overturns. Furthermore, by locating the safety device 20 at as high a point as possible above the gasoline tank and the carburetor, the fuel within the pipes and within the passages in the valve 50 is under partial vacuum or negative pressure at all times and especially so when the pump 16 is operated. The pressure within the casing 20 is substantially normal and, if there is any tendency for the valve to leak, the leakage will be air into the pipe line, rather than fuel from the valve. Furthermore, the excess atmospheric pressure acts on the large end of the plug valve body 58 and tends to move the valve body toward the right, as viewed in Fig. 2, further insuring proper seating of the plug 58 in the valve body 50. The small end of the plug 58 is sealed by the cap 66 and, thus, if for any reason, the plug valve 58 should be moved even slightly toward the left as viewed in Fig. 2 in an unseating direction, the pressure within the cap 66 will be less than the atmospheric pressure within the casing and because of this difference in pressure the plug 58 will, even in the absence of the spring 64, tend to move in a seating direction. This also insures that there will be no fuel leakage from the valve 50 at any time during the normal use of the vehicle. If, however, there should be any leakage from the valve 50 when the vehicle is upset, the fuel will collect within the hermetically sealed casing 20 and cannot escape to do possible damage. If, however, the shut-off device is installed below the engine carburetor and pump and leakage occurs about the valve and the casing fills with fuel, the fuel cannot escape and the device will still be completely operative as the fuel will not hinder the movement of the weighted member 70 but will, on the other hand, rather desirably damp its unnecessary oscillations, thereby performing the function of the friction member 72.

Having thus described my invention, what I claim as new and desire to secure by Letters Patent of the United States is:

1. A safety device for motor vehicles having a conduit for fuel from a fuel tank to a pump and carburetor having in combination, a valve in the conduit between said tank and said pump and carburetor, a casing surrounding said valve, a weighted member within said casing connected to the valve for automatically closing the valve to shut off the flow of fuel when the vehicle overturns, means in said chamber yieldingly engaging said weighted member for checking undue oscillation of said weighted member to maintain the valve open during normal operation of the vehicle, and means for maintaining the weighted member in valve closing position after the vehicle has been overturned, said last mentioned means and said engaging means being arranged to urge said weighted member in a valve seating direction.

2. In a motor vehicle, a fuel tank, a conduit for the fuel from the tank to the carburetor, a pump for pumping fuel through said conduit from the tank to the carburetor, a valve in said conduit located substantially above the pump and carburetor, an air tight chamber enclosing said valve, a weighted member within the chamber connected to said valve for automatically closing the valve to shut off the flow of fuel from said tank to the pump and carburetor when the vehicle overturns, resilient means in said chamber releasably engaging said weighted member for maintaining the valve open during normal operation of the vehicle, and means for maintaining the weighted member in valve closing position after the vehicle has been overturned.

3. A vehicle having a propelling engine, a fuel line for the engine and a valve installed in said fuel line, said valve including a movable valve member, a weighted member connected to the valve member for automatically closing the valve to shut off the flow of fuel when the vehicle is overturned, and spring means disposed in the path of movement of the weighted member and engaging the latter to urge the same in a valve seating direction, and acting also to prevent closing movement of the valve during normal operation of the vehicle.

4. A safety device for motor vehicles comprising a fuel-controlling valve, an hermetically sealed enclosure surrounding said valve, a member within said hermetically sealed enclosure connected to the valve for automatically closing the valve to shut off the flow of fuel from the tank to the pump and carburetor when the vehicle is overturned, means within said hermetically sealed enclosure for maintaining the automatic closing means in valve closing position after the vehicle has been overturned, and means controlled by the operator for releasing the valve closing member to move said member to valve open position.

5. In a motor vehicle safety device adapted to be secured to a pipe through which fuel flows from a fuel supply tank to a fuel pump and a carburetor, a valve in said pipe, a hermetically sealed casing surrounding said valve, a weighted member connected to said valve for automatically closing the valve to shut off the flow of fuel from the tank to the carburetor, means within said casing for releasably engaging the weighted member for maintaining the weighted member in valve open position during normal operation of the vehicle and for urging the weighted member in a valve seating direction, and means for maintaining the weighted member in valve closing position after the vehicle has been overturned.

6. A safety device adapted to be inserted in a pipe line from a fuel supply tank to a fuel pump and carburetor having in combination, a valve in said pipe, a hermetically sealed casing surrounding said valve, a weighted member connected to said valve and located within said casing for automatically closing said valve to shut off the flow of fuel from said tank to said carburetor, means within the casing for releasably engaging the weighted member to maintain the same in valve open position during normal operation of the machine and for seating the valve to prevent leakage of fuel from the valve, and means for maintaining the weighted member in valve closing position after the vehicle has been overturned, said last mentioned means operating also to urge said valve in a direction to cause it to become more firmly seated to prevent leakage of fuel from said valve.

7. In a safety device for motor vehicles arranged to be installed in a pipe through which fuel flows from a fuel supply tank to a fuel pump and carburetor, a valve in said pipe, a hermetically sealed casing surrounding said pipe, a weighted member connected to said valve and located within said casing for automatically closing said valve to shut off the flow of fuel from said tank to said carburetor, means within the casing for releasably engaging the weighted member to maintain the same in valve opening position during normal operation of the machine and for setting the valve to prevent leakage of fuel from the valve, and means for maintaining the weighted member in valve closing position after the vehicle has been overturned, said last mentioned means operating also to urge said valve in a direction to cause it to become more firmly seated to prevent leakage of said valve, and means under the control of the operator for releasing said weighted member to return the weighted member to valve opening position.

8. A safety device for motor vehicles arranged to be inserted in the fuel line running from the tank to the fuel pump, said device comprising an automatically-operative shut-off valve including a valve casing in said line having inlet and outlet ports connected respectively to the tank side and the pump side of said line, a freely movable valve member in said casing controlling fuel flow between said ports and having a depending weight tending to maintain its position upon tilting of the casing whereby to shut off fluid flow between said inlet and outlet ports, said movable valve member having a part subjected both to the fuel pressure in the casing and to external atmospheric pressure in a direction tending to maintain the movable valve member seated on the casing when the fuel pressure within the casing is less than the external atmospheric pressure.

9. In a motor vehicle fuel supply system as in claim 8, said valve being a plug valve and the large end of the plug being exposed to the external atmospheric pressure.

10. A safety device for motor vehicles arranged to be installed in a fuel conduit leading from a fuel tank to a pump and carburetor, said device including a valve in the conduit, a weighted member connected to said valve for automatically closing it to shut off the flow of fuel from the tank to the carburetor when the vehicle overturns, means for maintaining said weighted member releasably in valve-closed position, and a fuel tight enclosure for the aforesaid elements, having valve means confronting the valve-closed position of said weighted member through which valve means access to said weighted member can be gained for returning it to open position.

11. In a motor vehicle, a fuel tank, an engine, a carburetor, a pump, a conduit for said fuel from the tank to the pump and carburetor, a valve in said conduit between said tank and pump and located above both whereby the fuel in the valve is at a sub-atmospheric pressure both when the pump is operating and when it is idle, said valve having cooperating relatively movable elements one seated on the other and arranged to be held in such relation by the suction of the fuel in the valve and the higher pressure of the atmosphere acting on a part of the valve means, and means for automatically closing said valve to shut off the flow of fuel from said tank to said carburetor when the vehicle is accidentally overturned.

12. In a motor vehicle having an engine, a carburetor, a fuel tank, a pump, a fuel conduit from the tank to the pump and carburetor, a valve in said conduit located substantially above the tank and carburetor, a hermetically sealed casing surrounding said valve, means connected to said valve and located within said casing for automatically closing the valve for shutting off the flow of fuel from the tank to the pump and carburetor when the vehicle overturns, and means controlled by the operator and insertable through said casing for returning the valve to open position.

JAMES E. GRAY.